No. 750,690. PATENTED JAN. 26, 1904.
H. B. PITNER.
UPHOLSTERING DEVICE.
APPLICATION FILED MAY 7, 1903.
NO MODEL. 5 SHEETS—SHEET 1.
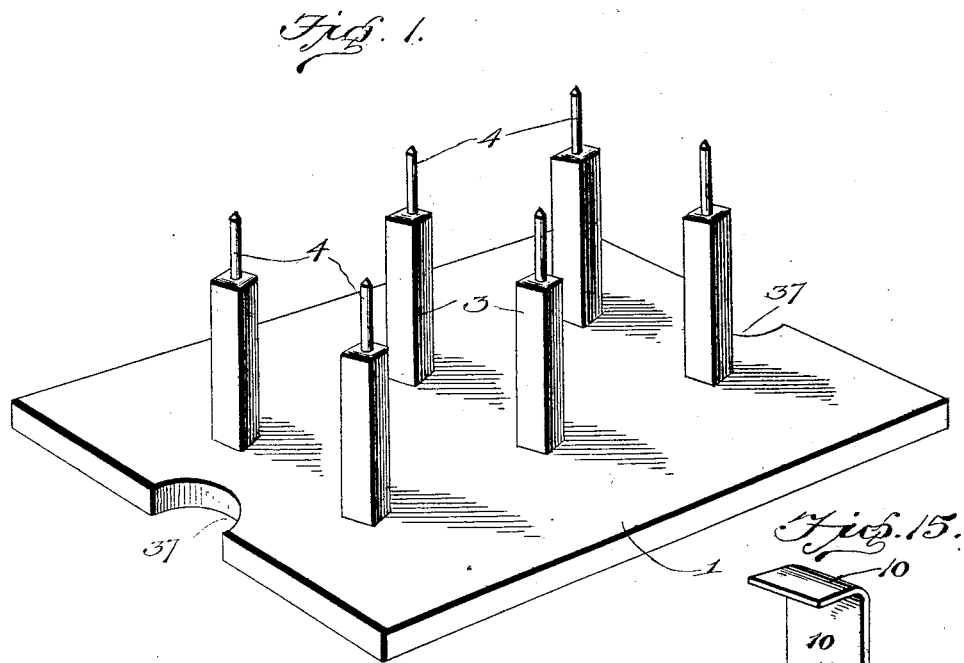
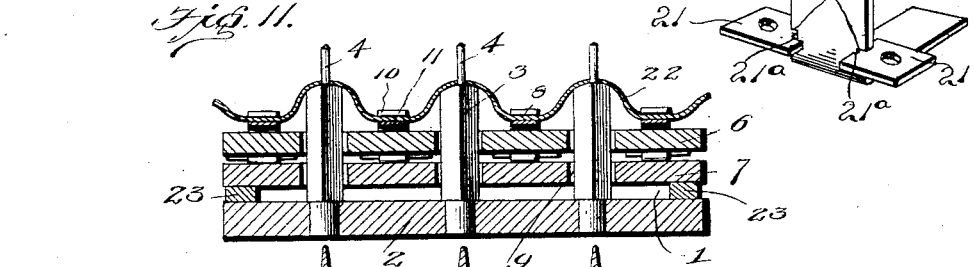
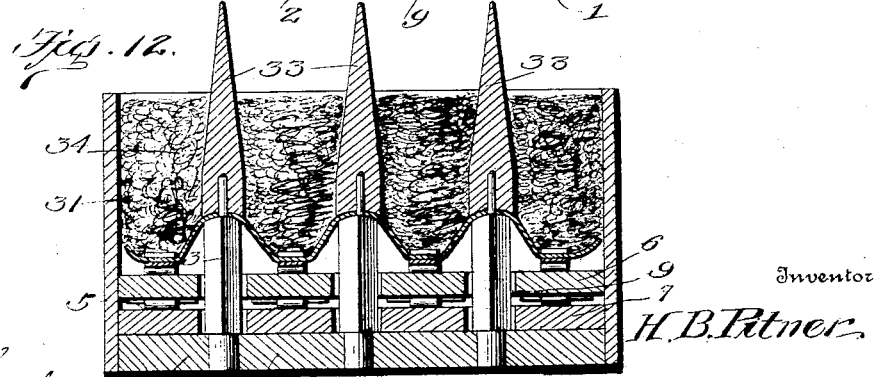

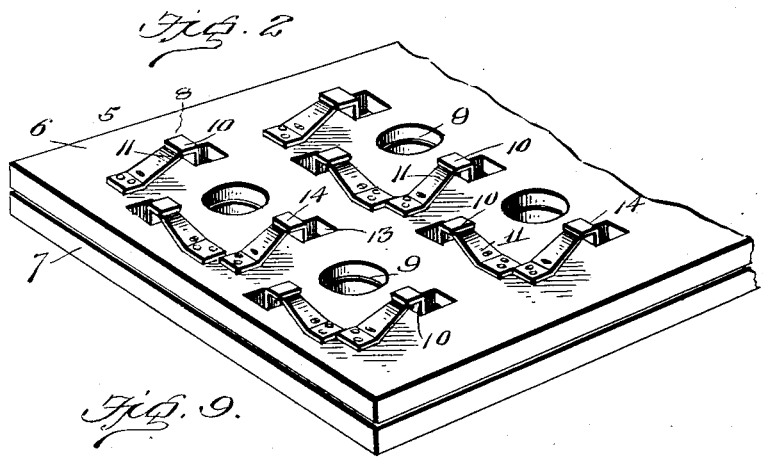
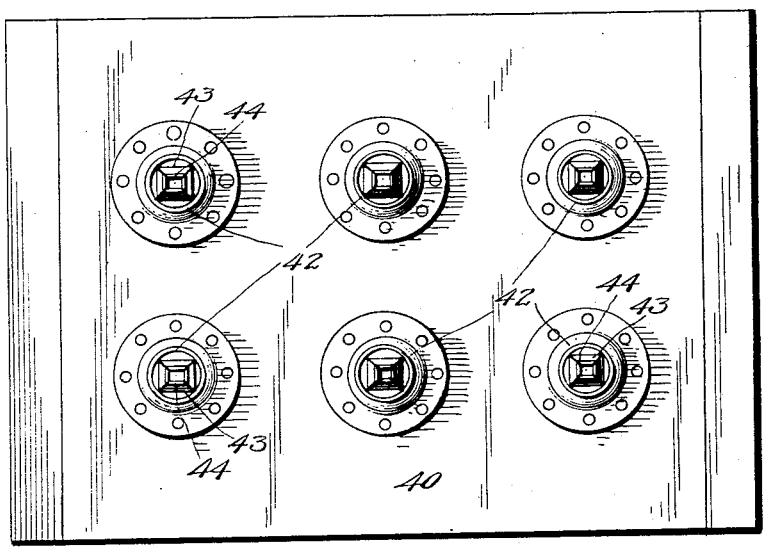
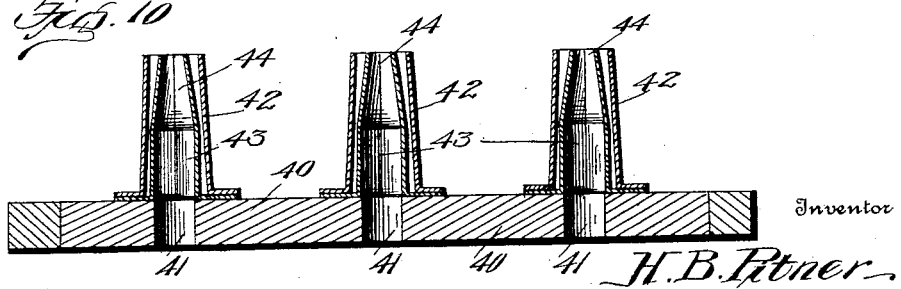

No. 750,690. PATENTED JAN. 26, 1904.
H. B. PITNER.
UPHOLSTERING DEVICE.
APPLICATION FILED MAY 7, 1903.
NO MODEL. 5 SHEETS—SHEET 3.
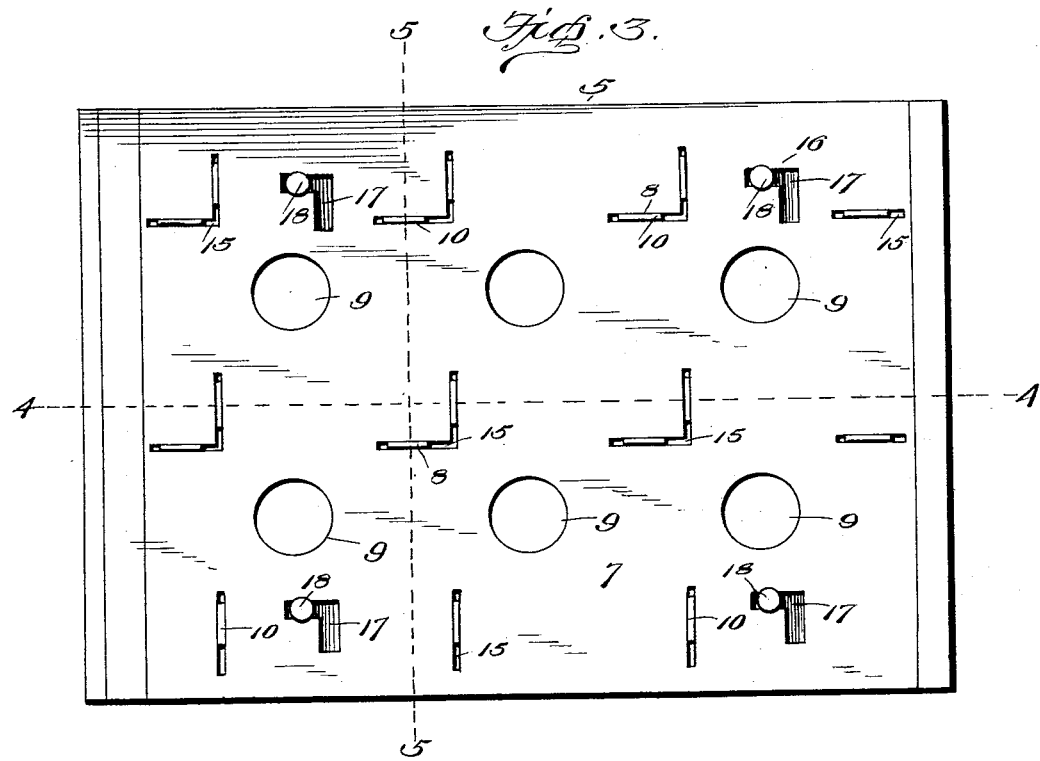
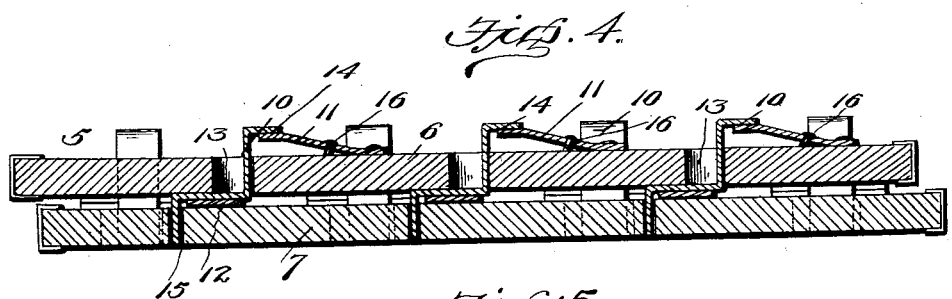
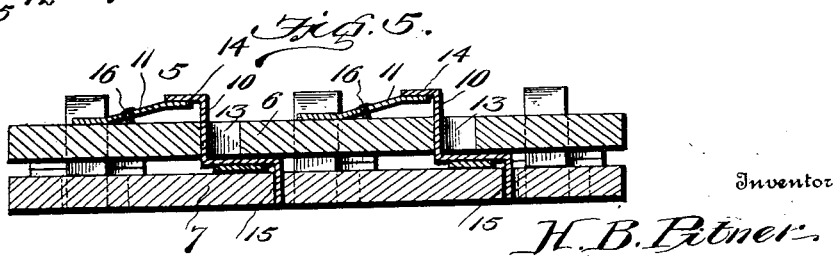
Witnesses
Inventor
H. B. Pitner
By H. B. Wilson
Attorney

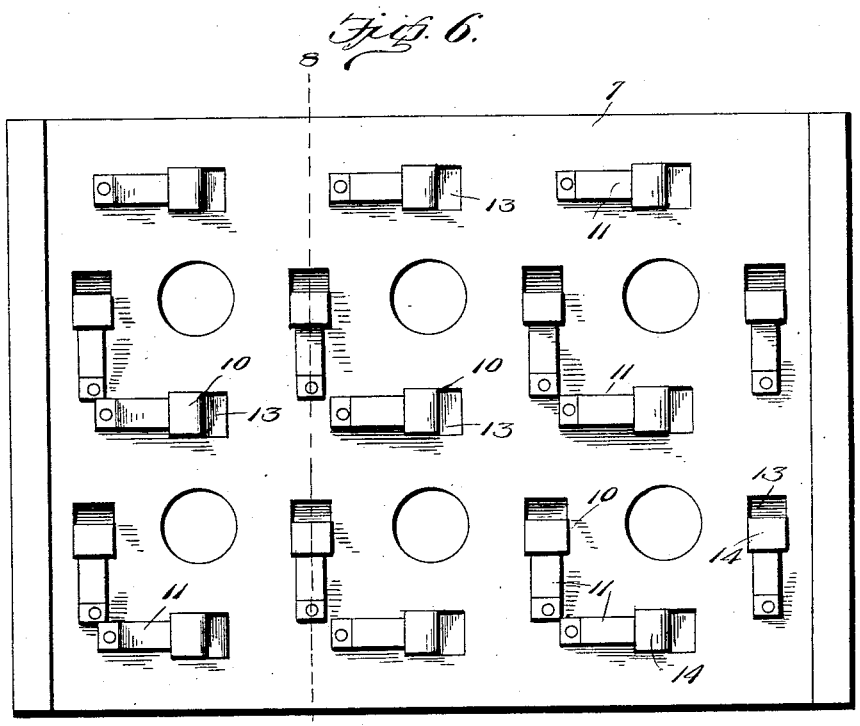
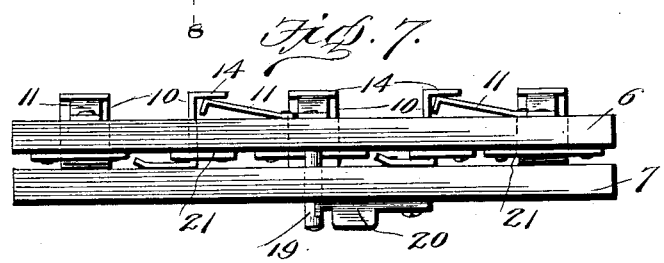
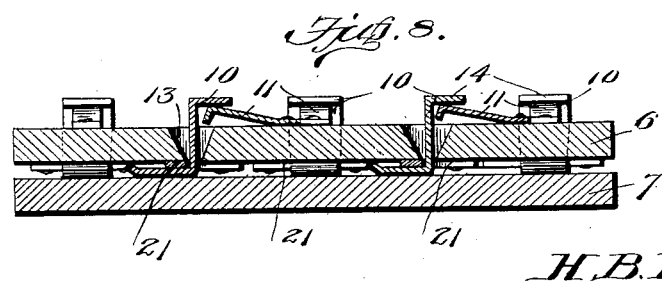

No. 750,690. PATENTED JAN. 26, 1904.
H. B. PITNER.
UPHOLSTERING DEVICE.
APPLICATION FILED MAY 7, 1903.
NO MODEL. 5 SHEETS—SHEET 5.
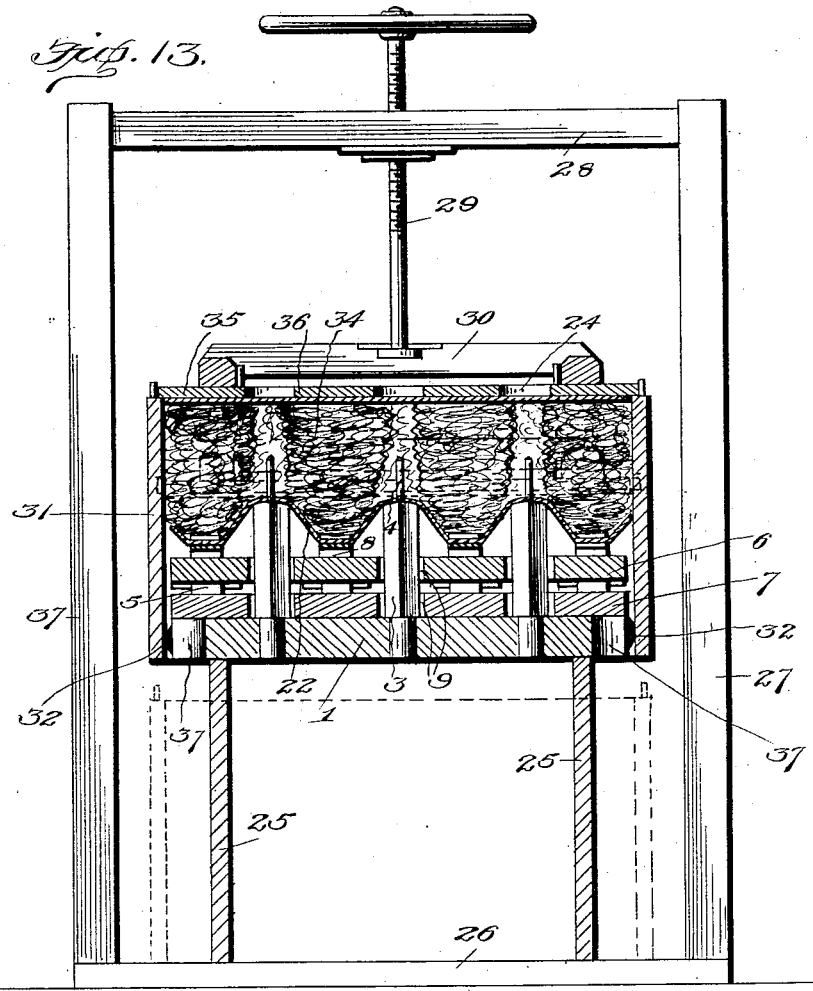
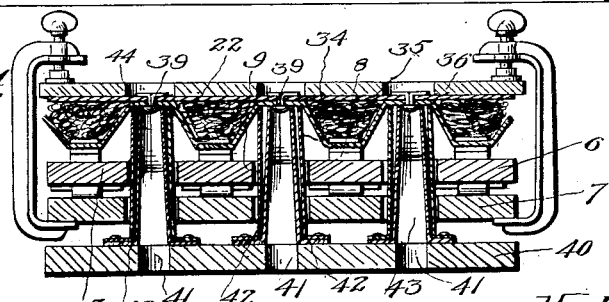
Witnesses
Inventor
H. B. Pitner
Attorney No. 750,690. Patented January 26, 1904.

UNITED STATES PATENT OFFICE.

HENRY B. PITNER, OF EAST AURORA, NEW YORK.

UPHOLSTERING DEVICE.

SPECIFICATION forming part of Letters Patent No. 750,690, dated January 26, 1904.

Application filed May 7, 1903. Serial No. 156,125. (No model.)

*To all whom it may concern:*

Be it known that I, HENRY B. PITNER, a citizen of the United States, residing at East Aurora, in the county of Erie and State of New York, have invented certain new and useful Improvements in Upholstering Devices; and I do declare the following to be a full, clear, and exact description of the invention, such as will enable others skilled in the art to which it appertains to make and use the same.

My invention relates to improvements in upholstering devices, and more especially to a machine or apparatus for doing plaited upholstered work, such as cushion seats and backs for carriages, chairs, sofas, and the like.

The main object of the invention is to improve and simplify the construction of such devices whereby the work may be performed in a more efficient and expeditious manner.

Other objects are to provide means for holding the leather, cloth, or other fabric which forms the cover of the cushion in position during the formation of the same and permitting of its ready removal from the device when finished and to provide means for holding and inserting the buttons in the cushion.

With these and other objects in view the invention consists of certain novel features of construction, combination, and arrangement of parts, as will be more fully described, and particularly pointed out in the appended claims.

In the drawings, Figure 1 is a perspective view of the tuft-forming or pin board. Fig. 2 is a similar view of a portion of the plait-holding board. Fig. 3 is a bottom plan view of the same. Fig. 4 is a longitudinal sectional view taken on the line 4 4 of Fig. 3. Fig. 5 is a transverse sectional view through the same. Fig. 6 is a top plan view of a plaiting-board, showing a modified construction. Fig. 7 is an end elevation of the board shown in Fig. 6. Fig. 8 is a sectional view taken on the line 8 8 of Fig. 6. Fig. 9 is a top plan view of the button or nail holding and inserting device. Fig. 10 is a longitudinal sectional view through the same. Fig. 11 is a sectional view showing the plaiting-board supported upon the tufting or pin board by suitable spacing-blocks and the plaits in the covering engaged with the clamping or holding devices upon the plaiting-board. Fig. 12 is a similar view showing the spacing-blocks removed and the stuffing-box and the pegs in position. Fig. 13 is a similar sectional view showing the same in a press with the padding or filling material in the stuffing-box ready to be compressed. The dotted lines represent the position of the parts after the padding has been compressed. Fig. 14 is a sectional view through the plaiting-board, the partly-finished cushion, the follower, and the tube-board for holding and inserting the buttons. Fig. 15 is a detail sectional perspective view of a plaiting-board shown in Figs. 6, 7, and 8.

Referring to the drawings more particularly, the numeral 1 denotes a tufting device or pin-board comprising the rectangular base 2, upon the upper surface of which are secured the studs or posts 3, which are provided with the upwardly-projecting pointed pins 4. These studs or posts 3 are spaced at regular intervals upon the base-board, and any number may be used, according to the number of biscuits or tufts desired in the cushion. This pin-board is used in connection with either of my two forms of plait-holding boards.

In Figs. 2 to 5 of the drawings I show my preferred construction of plaiting-board 5. The same comprises the upper member or board 6, the lower member or board 7, and the plait clamping or holding devices 8, secured to said members. The lower member or board is adapted to have limited longitudinal and transverse sliding movements with respect to the upper member or board in order to disengage or free the plaits of the covering from the clamping devices. These members 6 and 7 are each provided with circular apertures 9, located therein in the same relative positions as the posts or studs 3 on the board 2, and when the clamping devices 8 are in their closed or locked position these apertures in the two members aline. The clamping devices 8 are arranged in longitudinal and transverse rows between these apertures 9, and each comprises a sliding latch 10 and a spring-keeper 11. The latch 10 is slidably mounted in a suitable guide 12 and is secured to the under side of the upper member 6 and has an upwardly-bent portion which projects through an opening 13 in the upper member and is formed with a bent end 14. The opposite end of the latch is bent downwardly and is seated in a slit 15 in the lower member. By this construction it will be seen that a sliding movement of the lower member in the proper direction will move the latch with it and cause the bent end 14 to move toward or from the spring-keeper 11, which is secured upon the upper surface of the upper member at the proper point. Each of these springs is provided with a tension device or screw 16, by means of which the clamping action of the device may be regulated. A sliding movement of the lower member or board in a longitudinal direction will disengage the transverse rows of latches from their keepers, and a similar movement in a transverse direction will disengage the longitudinal rows. In order to guide and limit these sliding movements of the lower member and to hold the two members together, I provide in the lower one the longitudinal and transverse intersecting slots 17, through which a headed screw or pin 18 passes. Said screw or pin is carried by the upper board or member.

In the construction of the plaiting device or board shown in Figs. 6 to 8 of the drawings the upper and lower members are made so as be readily detachable. One way of effecting this is by providing each end of the upper member with the depending lugs or studs 19, which project through openings in the lower board and which have their lower ends notched or recessed to receive a latch 20, pivoted to the bottom of the lower member. The latches 10 instead of having a sliding movement toward and from the spring-keepers 11 are pivoted so as to swing toward and from them. Each of these latches is substantially right angular and is pivoted at its angle in the center of the slot 13 between the notched plates 21. Said latches have notches 10ª in their sides at said angles engaged by the notches 21ª of the said plates, as shown in Fig. 15. The horizontal portion of the latch is adapted to be clamped between the upper and lower members to hold said latch against its keeper, and as soon as the lower member is removed from the upper one the latches will fall away from their keeper to release or disengage the covering of the cushion.

Either one of these plaiting-boards is adapted to be used upon the pin-board or tufting device 1 by placing the former upon the latter with the studs or posts 3 projecting through the openings 9. The leather, cloth, or other material 22 which is to form the top of the cushion is laid out with sufficient fullness to form the plaits, and a hole or perforation is made in the same at the points where each button is to be placed. The goods 22 is then placed face down upon plaiting-board with the pins 4 projecting through said perforations. The plaits are then formed and placed between the ends 14 of the latches and their spring-keepers 11 in order to hold them in position and upon the board. I preferably employ the spacing-blocks 23, as shown in Fig. 11, between the pin-board and the plaiting-board, so that by removing said blocks after the goods or material 22 is secured in position the plaiting-board will drop slightly to take up any fullness in the goods or material, and thus permit of smoother work. While the employment of these blocks is advantageous, it will be understood that they need not be removed or used, if one so desires. When the goods has thus been secured upon the boards, they are placed in a suitable press 24 and supported upon the stand 25. The press, as shown in Fig. 13, comprises the base 26, upon the central portion of which the stand 25 is mounted; the vertical standards 27 upon each end of the base; the cross-beam 28, connecting the upper ends of the standards; the screw 29, working in said cross-beam, and the pressure-head 30, swiveled upon the lower end of said screw. The guide or stuffing-box 31, which is essentially a box or frame without either top or bottom, is placed over the plaiting and pin boards, as seen in Fig. 13, and held in place by frictional contact with the buffers 32 upon the pin-board. The holding and guiding pegs 33 are then applied to the studs or posts 3. These pegs have their upper ends tapered to a point and are formed with a recess or opening in their lower ends, into which recess the pins 4 upon the studs 3 are adapted to project. The padding or filling material 34, consisting of curled hair, waste cotton, or other material, is then placed in the stuffing-box around the pegs 33 and is evenly distributed to form a cushion of the desired thickness. When this is done, the pegs may be removed, and the cushion-back 35 and the follower-board 36 are then placed in position upon the padding and beneath pressure-head 30 of the press. The screw 29 is then screwed down to force the parts to the dotted-line position shown in Fig. 13 to compress the said padding. The follower 36 consists of a rectangular board provided with circular openings arranged in the same relative positions as the studs 3. After the filling or padding has been compressed the guide or stuffing box is dropped upon the base 26 below the pin-board, and suitable clamps may be used to grasp the follower-board 36 and the bottom of the plaiting-board 5 at the ends of the latter. Recesses 37 are cut in each end of the pin-board to permit said clamps to engage the plaiting-board. The screw 29 is then withdrawn, and the follower-board, the plaiting-board, and interposed partly-finished cushion, clamped together as aforesaid, are removed from the press and the pin-board 1 and are taken to a work-bench, where the buttons are secured to the cushion, as shown in Fig. 14 of the drawings.

The button-inserting device, which is adapted to hold and insert the clench-buttons 39, comprises the rectangular board 40, having openings 41 disposed in the same relative positions as the studs 3 on the pin-board. About these openings are arranged the concentric thimbles or tapering tubes 42, within which are disposed the tubular holders 43, formed with spring arms or fingers 44. In placing the clench-buttons 39 in the holders 43 the board is inverted and said buttons are dropped with the point downward into the openings 41. In using this button-board the clamped follower-board 36 and plaiting-board 5 are placed upon the bench with the latter board uppermost, and the tube-board is then placed upon the same so that the tubes 42 project into the openings 9 in the said plaiting-board. A punch or other device is then forced into said tubes to drive the points of the button through the cushion. The whole device is then turned up and the points or prongs of the buttons bent to clench them, as shown in Fig. 14. The tube-boards may then be removed and the clamps loosened to free the follower-board. In order to disengage the completed cushion from the latches of the plaiting-board, the lower member or board of the plaiting-board is operated as previously explained.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. In an upholstering device, the combination of a tufting or pin board provided with tuft formers or pins and a plaiting-board provided with plait holding or clamping devices arranged between said tuft formers or pins and means for simultaneously releasing said holding or clamping devices.

2. In an upholstering device, the combination of a tufting or pin board provided with tuft formers or pins and a plaiting-board provided with plait holding or clamping devices arranged between said tuft formers or pins and means for simultaneously releasing a plurality of said holding or clamping devices, substantially as described.

3. A plaiting device comprising opposing members movable longitudinally with relation to each other, one having holders, and the other having keepers to engage and disengage the holders by the longitudinal movement of the opposing members.

4. In combination with a base having spaced tufting-studs, and coöperating means to form tufts, a plaiting device comprising opposing members movable longitudinally with relation to each other and having openings through which the tufting-studs project, one of said movable members having holders and the other having keepers to engage and disengage the holders by the relative movement of said opposing members.

5. A plaiting device or board for upholstering, comprising an upper member, a lower member having longitudinal and transverse sliding movements with respect to said upper member, sliding latches carried by said upper member and engaged with the lower member whereby they are operated by the movement of said lower member, and spring-keepers upon the upper members for said latches, substantially as described.

6. In an upholstering device, the combination with an apertured plait-holding board and a correspondingly-apertured follower, of a button or nail holding and inserting device comprising an apertured base or board, tapered tubes surrounding the apertures in said board and holders within said tubes provided with spring-fingers adapted to engage the buttons or nails, substantially as described.

7. In an upholstering device, the combination of a tufting-board provided with tuft-forming pins, a plaiting-board adapted to hold the plaits of the covering down between said pins, removable guide and holding pegs upon said pins, a stuffing-box or frame, a follower, formed with apertures registering with the said pins, and means for depressing the follower, substantially as described.

In testimony whereof I have hereunto set my hand in presence of two subscribing witnesses.

HENRY B. PITNER.

Witnesses:
S. D. EISEMAN,
E. S. GRAY.